March 18, 1958     H. H. SHAKELY     2,827,236
CONTINUOUS DRAFT INDICATOR FOR ROLLING MILLS
Filed Feb. 13, 1952     6 Sheets-Sheet 1

Fig. 1.

INVENTOR
Howard H. Shakely
by Hoopes, Leonard & Glenn
his attys

March 18, 1958 H. H. SHAKELY 2,827,236
CONTINUOUS DRAFT INDICATOR FOR ROLLING MILLS
Filed Feb. 13, 1952 6 Sheets-Sheet 3

INVENTOR
Howard H. Shakely
by Hoopes, Leonard & Glenn
his attys.

March 18, 1958 H. H. SHAKELY 2,827,236
CONTINUOUS DRAFT INDICATOR FOR ROLLING MILLS
Filed Feb. 13, 1952 6 Sheets-Sheet 4

INVENTOR
Howard H. Shakely
by Hoopes, Leonard & Blum
his attys.

March 18, 1958     H. H. SHAKELY     2,827,236
CONTINUOUS DRAFT INDICATOR FOR ROLLING MILLS
Filed Feb. 13, 1952     6 Sheets-Sheet 6

Fig. 10.

INVENTOR
Howard H. Shakely
by Hoopes, Leonard & Glenn
his attys

United States Patent Office 2,827,236
Patented Mar. 18, 1958

2,827,236

CONTINUOUS DRAFT INDICATOR FOR ROLLING MILLS

Howard H. Shakely, Pittsburgh, Pa., assignor to Jones & Laughlin Steel Corporation, Pittsburgh, Pa., a corporation of Pennsylvania Application February 13, 1952, Serial No. 271,310

7 Claims. (Cl. 235—103.5)

This invention relates to a continuous device for a rolling mill to indicate the increase in elongation and thereby the decrease in thickness of a strip, of ferrous or other metal, passing through said rolling mill. More particularly, the invention pertains to apparatus and to a mechanical and electrical system to continuously indicate with accuracy the extent of reduction in thickness of such strip made by non-reversing rolling mills, particularly those in which relatively small reductions are effected. The invention is especially useful when applied to cold rolling mills, usually in combination with tension coilers, which operate on lighter gauges of strip or which effect relatively slight reductions in the thickness of the strip as in the case of temper rolling.

At the present time, almost all relatively light gauge ferrous strip is finished on so-called cold rolling or cold reduction mills. In such rolling, the screw-downs are used to adjust the gap between the working rolls to provide the desired amount of draft to yield the proper thickness of strip on the delivery side of the rolls.

In working with lighter gauges of strip or with heavier gauges of strip on which the desired draft is relatively small, the screw-down indicators are not particularly accurate in indicating the final thickness of the rolled strip. As a consequence, numbers of devices have been provided in the past to attempt to furnish a continuous and correct indication of the precise thickness of the rolled strip. Thus, tachometer generators and potentiometers have been used in electrical networks. Their difficulty has been that they represent a considerable investment and may have an inherent error in operation which is of an order which yields inaccurate results regarding the percentage reduction in strip thickness sought to be measured. The manufacturers of that equipment provide, in many cases, compensatory adjustments or equipment which complicate the entire assembly and/or require precise and continuous expert attention to maintain in good running order. In the case of tachometer generator assemblies, compensation for variations in the speed of the strip being rolled has to be provided even though the reduction in thickness might remain unchanged. Another form of prior device employed friction surfaces and a stroboscopic disk but was subject to slippage, localized wear and the problem, in some cases, of confusing readings for different reductions because of the nature of the stroboscopic operation. Continuous draft indicators using gears have also been employed but were relatively inaccurate and cumbersome.

The structure and system of the present invention overcome the foregoing difficulties. The new apparatus is relatively inexpensive and, at the same time, yields accurate indication of the relation of the reduced thickness of the strip being rolled to the desired thickness so that corrective adjustment of the screw-downs, if required, can be applied immediately. Provision is made in the new device to adjust it rapidly and accurately whenever a change in the per centum amount of draft is to be made. No adjustments of a compensatory nature to overcome inherent characteristics are required and the parts of the new device remain in good working order at all times without the need for expert maintenance. If there is a difference in the reduced thickness of the strip being rolled from the prescribed reduction, the extent of that difference can readily be ascertained. No adjustment or change is needed in the new apparatus and system for variations in the rolling speed, other circumstances remaining unchanged.

Other objects and advantages of this invention will be apparent from the following description and from the drawings, which are illustrative only, in which.

Referring to the drawings, the numeral 10 may be used to indicate a non-reversing rolling mill stand having working rolls 11 therein which rotate in the respective directions indicated by the arrows. The gap between the rolls 11 determines the amount of draft applied to a strip 12 being rolled, the strip 12 being thicker by the amount of that draft on the entry side of rolls 11 than it is on the delivery side. In the schematic rolling mill illustrated in Figure 1, an entry roll 13 may be provided to define that portion of the pass line of strip 12. Similarly, on the delivery side of mill 10, there may be provided a delivery roll 14 which may be used to define its portion of the pass line of strip 12 which on the delivery side has a reduced thickness. A payout reel 15 of a conventional nature is at the head of the pass line of strip 12 and feeds from the coil thereon that strip 12 being reduced at the time being by the rolls 11. On the delivery side of mill 10, the reduced thickness of the strip which may be termed 12′ may be continuously wound up on a conventional coiler 16. Coiler 16 may also be used to provide tension in the delivery portion of strip 12 denominated 12′ between the bite of the rolls 11 and the reel 16.

In relatively light reductions such as occur in temper passing and in rolling operations on lighter gauges of strip, the amount of side spreading is negligible particularly in those cases in which a portion of the strip, such as portion 12′, is under tension in accordance with established practice. The entry portion of strip 12 is also under tension usually as a consequence in the illustrated embodiment of the bite of the rolls 11.

It follows, therefore, that the percentage reduction between the thickness of strip 12 on the entry side relative to that represented by the portion 12′ is in exact inverse ratio to the percentage elongation in portion 12' which takes place by virtue of the draft effected by the rolls 11. If the rolls 13 and 14, respectively, are positioned to deflect the pass line as shown in the illustrated embodiment the surface speeds of those rolls will correspond, respectively, to the linear speed of the entry portion of strip 12 and of the delivery portion 12' of the strip 12. Insurance of such correspondence can be provided by maintaining smooth surfaces on the rolls 13 and 14. Normally, in cold rolling there will be no roll pickup of foreign material to disturb the correspondence in question. In the embodiment shown, the entry roll 13 and the delivery roll 14 are ground to the same diameter and finish and are periodically checked. In that way, the difference between the respective angular speeds of rotation of the respective rolls 13 and 14 is a direct measure of the percentage elongation in the strip 12 effected by the rolling operation of mill 10, or stated in another way, is a direct measure of the percentage reduction in thickness in the strip 12 effected by mill 10. The mill, the various rolls, reels and accessory equipment not illustrated, are conventionally supported, mounted and controlled.

In the new structure and system of this invention, entry roll 13 may be provided with a sprocket 17 fastened thereto so as to rotate therewith. Similarly, delivery roll 14 may be provided with a sprocket 18 fastened thereto so as to rotate therewith. Sprockets 17 and 18 are preferably of identical dimensions. A sprocket chain 19 connects sprocket 17 in a positive manner with the teeth of a sprocket gear 20 keyed to an input shaft 21 in a gear transmission 22. A sprocket chain 23 connects sprocket 18 in a positive manner to a sprocket gear 24 keyed to a distributer shaft 25 in a distributer 26. In the embodiment shown, sprocket gears 20 and 24 are identical. Hence, the difference between the slower rotational speed of sprocket 20 and the faster rotational speed of sprocket gear 24 remains a direct and accurate measure of the percentage reduction in the thickness of strip 12 effected by the rolls 11.

An indicator 27 cooperates with gear transmission 22 and distributer 26 to indicate the existence of isochronism in the pertinent parts of the new system when the desired percentage reduction in thickness is being effected, or, to indicate a lack of such isochronism requiring a corrective adjustment, as of the screw-downs of mill rolls 11, to produce the desired thickness in the strip on the delivery side of mill 10. It may be noted that this invention operates to indicate percentage reduction in thickness and percentage elongation in length so that the particular thickness of the strip on which the continuous reduction indication is made is not of moment nor is the speed with which that strip passes through mill 10. Normally, heavier gauges will have a slower rolling speed. In every case, the final absolute thickness of the strip is readily determinable by multiplying the initial gauge of the strip on reel 15 by the percentage reduction in thickness.

Gear transmission 22 comprises a base 28 having sides 29 welded thereto and provided with a sealing flange 30. Bolt holes 31 are provided in base 28 to enable transmission 22 to be secured adjacent sprocket gear 20 so that input shaft 21 can be keyed or otherwise directly coupled to gear 20. One of the sides 29 is provided with a pipe inlet 32 normally closed by a plug 33 immediately following the replenishment of the oil maintained in the bottom of base 28. That oil normally will have a depth sufficient so that the bottoms of the gears on input shaft 21 and on an output shaft 34 dip into the oil and thereby maintain the moving parts in a lubricated condition. A drain opening 35 normally closed by a plug 36 is also provided in the bottom of base 28. Sides 29 normal to the axes of shafts 21 and 34 may be provided with semi-circular bearing recesses 37 defined by the flanges 38 in which tapped holes 39 are provided for bolts 40. A transmission cover 41 is also provided with a sealing flange 42 to mate with flange 30, registering openings being provided in the respective flanges for bolt and nut coupling one to the other to make an oil-tight completely enclosed case for transmission 22.

One side of cover 41 and the adjacent portion of the top thereof is provided with a door 43 connected to cover 41 by a hinge 44. A handle 45 is used to open and close door 43. The gable ends of door 43 have interior edge extensions 46 which frictionally engage the adjacent inner sides of cover 41 to hold door 43 in place when it is closed. Splash guards 47 are provided along the remaining joints between door 43 and cover 41 to minimize any leakage of oil through those joints in the course of operation of transmission 22.

Opposite sides of cover 41 normal to the axes of the shafts 21 and 34 are provided with bearing recesses 48 defined by flanges 49 having tapped bolt openings 50 therein for bolts 51. A bearing cage 52 and a bearing and oil seal retainer 53 are provided and held in place respectively relative to base 28 and to cover 41 by the bolts 51 and 40 respectively. A thrust ball bearing 54 and a conventional ring oil seal 55 respectively operatively engage shaft 34 and a spacer 56 to provide frictionless bearing and oil sealing at the extension end of shaft 34 where it passes beyond the interior of transmission 22 so that it may be directly coupled to a conventional circuit breaker 57 by means of a coupling 58. A similar bearing and sealing arrangement is provided for the extension end of shaft 21 where it passes beyond the interior of the other side of transmission 22 for keyed engagement with the hub 59 of sprocket gear 20.

Figure 5:
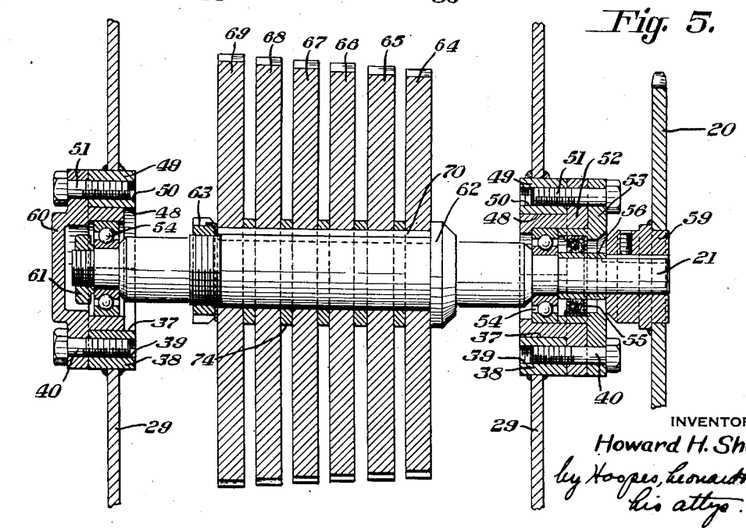
Figure 5 is a view on an enlarged scale of the input shaft subassembly in the gear transmission taken along line V—V of Figure 4.
Figures 6, 7:
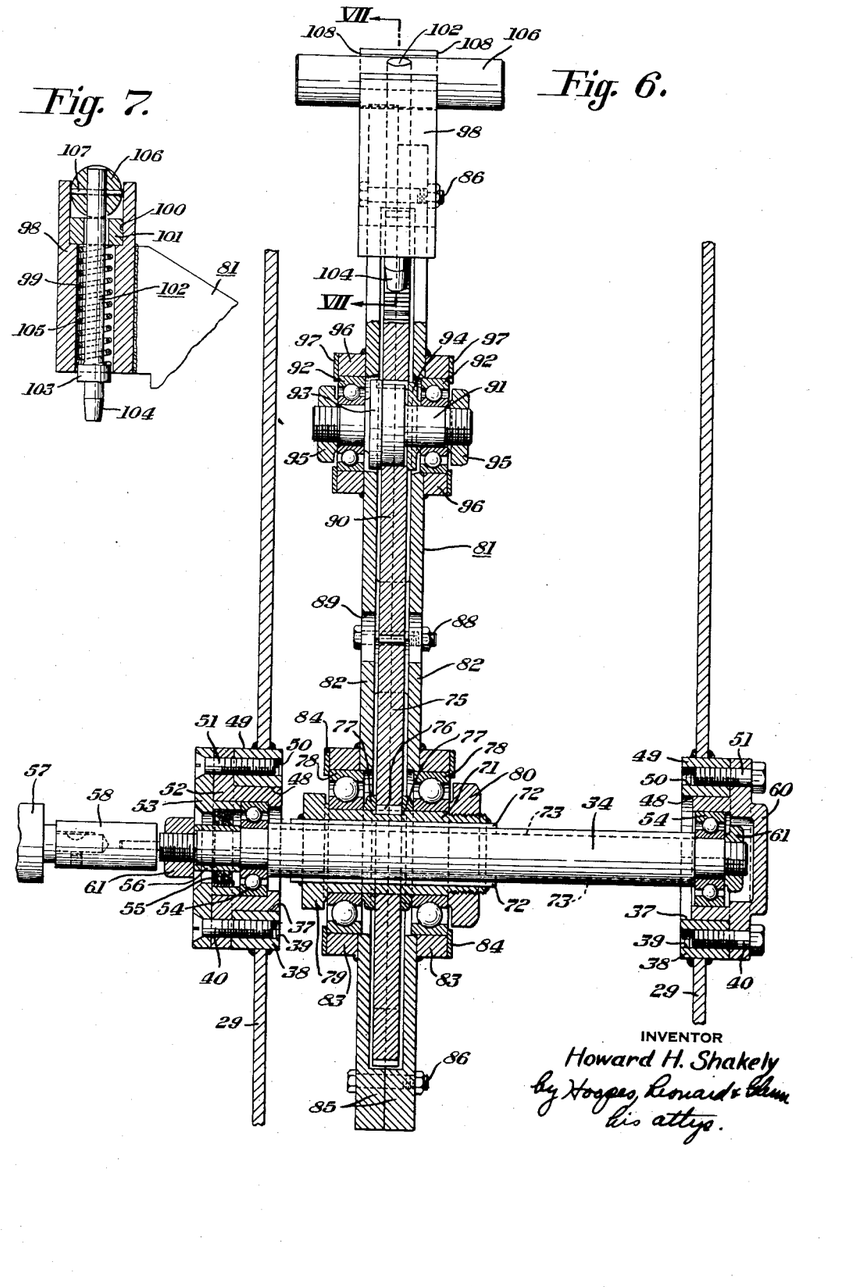
Figure 6 is a view on an enlarged scale of the output shaft and gear changer housing subassemblies taken along line VI—VI of Figure 4.
Figure 7 is a detailed view in section taken along line VII—VII of Figure 6.
Figure 9:
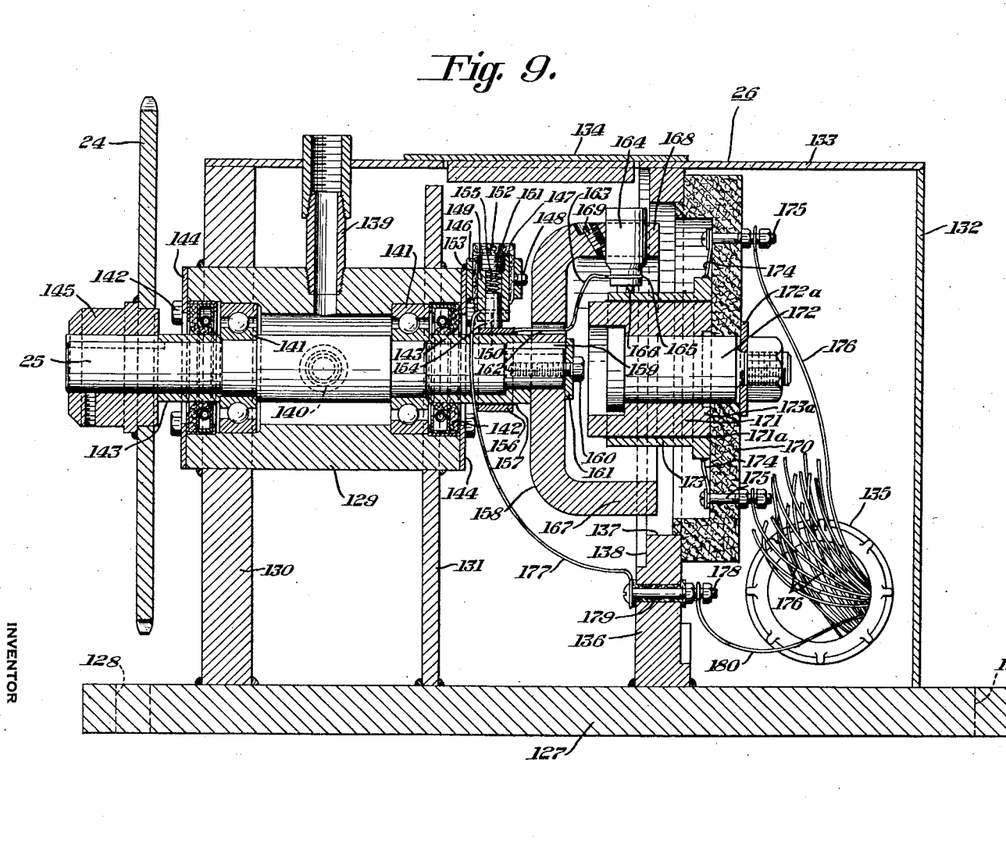
Figure 9 is a view in vertical section through the axis of the shaft of a new distributer which is utilized in the system shown in Figure 1.

The other ends of shafts 21 and 34 respectively, as shown in Figures 5 and 6, do not extend beyond the interior of transmission 22. A bearing cap 60 completely encloses those ends and centers the bearings 54 at those ends, no oil seal being provided. Lock nuts 61 on the respective ends of the respective shafts, including hub 59 which serves as a lock nut at its end of shaft 21, serve to assist in maintaining the axial bearing and sealing subassemblies of those shafts.

Shaft 21 is provided with an integral flange 62 against which a change gear subassembly is pressed by lock nut 63. A plurality of change gears for timing numbered 64 to 69, inclusive, in the illustrative embodiment are provided on shaft 21 and are keyed thereto by a key 70. The timing gears 64 to 69 are of different diameters and have a different number of teeth. The gears may preferably be in the form of spur or other cylindrical tooth surface with the teeth around the outer periphery thereof capable of tangential meshing. Metal spacers 74 are preferably provided to separate the respective timing gears. Hence, as sprocket 20 revolves, the timing gears 64 to 69, inclusive, also revolve.

Output shaft 34 is provided with a hollow spindle 71 which is slidably mounted thereon. Keys 72 are fastened to spindle 71 and adapted to slide in the splineways 73 extending longitudinally along opposite sides of shaft 34. A main gear 75 in turn may be keyed to spindle 71 by a key 76. Thus, spindle 71 will rotate with shaft 34 and gear 75 will also rotate with spindle 71 and shaft 34. Axial movement of spindle 71 relative to shaft 34 will carry gear 75 with it. The subassembly for preventing axial movement of main gear 75 relative to spindle 71 comprises metal spacers 77 and thrust ball bearings 78 positioned outwardly of the spacers 77. The respective bearings 78 are held between an annular flange 79 integral with spindle 71 and a lock nut 80.

A gear changer housing 81 is rotatably but not slidably mounted relative to spindle 71. Thus, sides 82 of housing 81 are provided with flanges 83 which engage the outer races of the respective bearings 78. Retainer rings 84 bolted to flanges 83 prevent any axial movement of housing 81 relative to spindle 71 while at the same time permitting rotational movement of housing 81 relative to spindle 71 and shaft 34. Longitudinal movements of the housing 81 will in turn slide spindle 71 along the splined shaft 34. The sides 82 are provided at their extremities with inwardly extending bosses 85 which are bolted together by bolt and nut assemblies 86 to maintain the rigid and exact spacing shown in Figure 6 of sides 82. Further bolt and nut assemblies 88 are provided midway up the height of housing 81 to join the sides 82. A relief opening 89 is provided in the center of one or both of the sides 82 laterally displaced from the area of engagement of main gear 75 and an idler gear 90.

Idler gear 90 is keyed to an idler shaft 91 having laterally extending bearing necks engaging thrust ball bearings 92. A flange 93 integral with shaft 91 and a spacer 94 in conjunction with the bearings 92 and lock nuts 95 hold gear 90 against any axial displacement relative to shaft 91. In turn, shaft 91 is held against any axial displacement relative to housing 81 and thereby relative to main gear 75 by the bearings 92, flanges 96 around the openings provided in the upper ends of sides 82, and retainer rings 97 bolted to the respective flanges 96.

The upper corner of the left-hand side 82 extends slightly toward door 43 and has a latch socket 98 welded thereto. Socket 98 is provided with a bore 99 extending therethrough, the axis of that bore generally intersecting the axis of shaft 34 at right angles thereto. A counterbore 100 is provided in the upper end of socket 98 to accommodate a backing ring 101 which is fastened in place at the bottom of counterbore 100. A latch 102 is provided having a stem which has a sliding fit with the central opening of ring 101. Latch 102 is provided with an annular flange 103 and a tapered lower end 104. In assembling the latch subassembly, a spring 105 is inserted over the upper end of stem of latch 102 before the stem is passed through the opening in ring 101 and assembled with a handle 106 pinned to the stem by a pin 107. The handle 106 is on the opposite side of ring 101 from spring 105 and the flange 103 against which spring 105 presses. The periphery of flange 103 slidably fits bore 99. The ends 108 of the portion of socket 98 above ring 101 parallel to sides 82 are slotted so that when handle 106 is in line with the slots in ends 108 parallel to shaft 34 the tip 104 will project below the lower end of socket 98. On the other hand, when handle 106 is raised and rotated less than 180 degrees, tip 104 will be withdrawn toward and possibly partly into bore 99.

A rest bar 109 in the form of an angle is welded to the top of a rigid post 110 which is permanently secured to base 28. The edge of bar 109 toward housing 81 is provided with stepped surfaces 111. The width of each step corresponds to the width of the extension of one side 82 of housing 81 and the position of each stepped surface in space corresponds to that of most nearly providing meshing engagement between idler gear 90 and the selected one of the timing gears 64 to 69, inclusive, on the line joining the centers of shafts 21 and 91. Generally, there will be one such stepped surface 111 for each of the positions of housing 81 along shaft 34 in the plane generally of the respective timing gears keyed to shaft 21. A precision adjustment for each surface 111 may be provided by means of adjustable positioning screws 112 extending through tapped holes in the back of bar 109 opposite each such stepped surface 111. Lock nut 113 may be employed to secure each screw 112 in adjustment position. The flange of bar 109 nearer housing 81 is conically drilled in each rest position corresponding to a surface 111 to provide a series of tapered latch holes 114 in registry with the axis of latch 102. Holes 114 fit the tip 104 so that in whatever rest position housing 81 is stopped to engage idler gear 90 with a timing gear, the movement of latch 102 forcing tip 104 into a hole 114 will lock housing 81 in that selected operative position. When it is desired to change the relative rotational speeds of shafts 21 and 34, latch tip 104 is withdrawn by handle 106 from the opening 114 with which it had been engaged, to permit the changer housing 81 to be moved on shaft 34 until opposite the timing gear in the bank 64 to 69, inclusive, having the desired ratio for the new percentage reduction whereupon latch 102 is released so tip 104 will snap into the hole 114 at its new operative position.

Circuit breaker 57 is conventional in nature and is provided with a casing stem 115 which fits into a ring 116 welded to a bracket 117 which extends upwardly and outwardly from side 29 and base 28 to which bracket 117 is welded on the side of transmission 22 opposite to the drive side adjacent sprocket gear 20. Ring 116 has its axis in alignment with the axis of output shaft 34. A set screw 118 holds circuit breaker 57 in place. A shaft 119 is keyed to coupling 58 which shaft rotates within breaker 57 and turns a rotor 120 having a contact button 121 therein extending toward an insulated cover 122 against which button 121 bears. A terminal 123 is provided on the inner side of cover 122 for sliding make-and-break engagement with button 121 in the course of the rotation of rotor 120. Terminal 123 is in electrically conductive relation with a screw terminal post 124 on the outside of cover 122. Button 121 in turn is in electrically conductive relation through rotor 120, shaft 119, wiper 125 and an electrical terminal terminating in screw terminal post 126. Thus, each time button 121 contacts terminal 123, an electrical circuit between posts 124 and 126, is completed. At all other times, the electrical circuit between posts 124 and 126 is broken.

Distributor 26 may comprise a base plate 127 which is provided with bolt holes 128 so that plate 127 can be secured adjacent sprocket gear 24. A shaft housing 129 is secured to plate 127 by partitions 130 and 131, partition 130 also serving as one side of a distributor casing 132. A casing top 133 is provided with an inspection opening covered by a plate 134. A pipe conduit 135 extends through one side of casing 132 to provide a passage for electrical connections into the interior of distributer 26. A further partition 136 is also secured to base 127 and has therein a circular opening 137. A counterbored recess 138 may be provided in partition 137 on that side thereof toward housing 129 for marking the identity of the electrical connections around opening 137. Pipe connections 139 and 140 respectively provide oil circulation passages between the interior of housing 129 and the exterior of distributer 26 for due connection to a suitable oil circulating mechanism. The respective ends of housing 129 are counterbored for engagement by thrust ball bearings 141 and ring oil seals 142. Hollow cylindrical spacers 143 and retainer rings 144 are used to hold the bearings 141 and the seals 142 respectively in place. At the end of the distributer shaft 25 engaged by sprocket gear 24, the integral hub 145 thereof is keyed to shaft 25 and fits against the adjacent spacer 143.

At the other end of distributer shaft 25, retainer ring 144 has a contact holder 146 welded thereto. A fixed contact member subassembly 147 is held in holder 146 by a set screw 148. Subassembly 147 comprises a hollow cylindrical metal contact post 149 having an exterior groove 150 adjacent the lower end thereof and being internally threaded at the upper end thereof for engagement by a screw cap 151, the cover 152 of which is made of fiber insulating material. An insulating fiber jacket 153 is provided around post 150 in the area of engagement between holder 146 and subassembly 147. A fixed contact member 154 of a conductive material slides within cylinder 149 and is urged outwardly by a spring 155 retained between the bottom of cap 151 and a contact ring 156. Contact ring 156 is continuously slidably engaged around its exterior periphery by fixed contact member 154 which may be in the nature of a carbon or metal button. The inner periphery of contact ring 156 is secured firmly to the exterior of the spacer 143 at that end of shaft 25. Such spacer 143 also acts as a sleeve to which ring 156 is secured as by a band 157 which may be of molded mica insulation interposed between ring 156 and sleeve 143 to electrically insulate the one from the other.

A cylindrical, generally dished brush holder 158 is provided and keyed to shaft 25 by a key 159 so as to be generally symmetrically and dynamically mounted and balanced relative to shaft 25. Key 159 also secures sleeve 143 at that end of distributer shaft 25. Hence, when distributer shaft 25 rotates, brush holder 158 and contact ring 156 will rotate therewith. A tapped opening in the end of shaft 25 adjacent brush holder 158 is engaged by a machine bolt 160 to press a retainer washer 161 against the adjacent sides of brush holder 158. An axially extending opening 162 passes from one side to the other through the central portion of brush holder 158 adjacent ring 156 for the passage of an electrical lead connection 163 thereto, one end being conductively fastened to ring 156.

A brush subassembly 164 is provided at its lower end with a groove 165 to which the other end of lead 163 is conductively fastened. Subassembly 164 is similar in construction to subassembly 147. A brush 166 extends from the bottom of subassembly 164 in a radial direction toward the interior of brush holder 158 within the space defined by the cylindrical edge 167 of brush holder 158. Subassembly 164 is secured in an opening 168 extending radially through edge 167 and is held in appropriate position by a set screw 169.

A commutator plate 170 is bolted to partition 136 to hold a commutator 171 by means of a bolt and nut assembly 172 in telescoping relation with the flanged edge 167 of brush holder 158 and in coaxial relation relative to distributer shaft 25, the exterior periphery 173 of commutator 171 being in engagement with brush 166 and concentric relative to the axis of distributer shaft 25 and of commutator 171. In the embodiment illustrated, commutator 171 comprises longitudinally extending conductive segments 173 insulated from one another and from a core 173a which surrounds the bolt in subassembly 172. As shown, there are twenty such segments each of which is connected by a separate electrical lead 174 to a terminal post 175. Each terminal post 175 is suitably insulated from commutator plate 170 since plate 170 as shown is made of insulating fiber. The bolt and nut subassembly 172 with the washer 172a is tight enough to prevent any rotation of commutator 171 from its selected assembled position. Subassembly 172 is also suitably insulated from commutator 171 in that the segments are suitably insulated from the core of commutator 171 by a mica cylinder 171a. The respective posts 175 are fastened to one end of a respective plurality of lead wires 176 which pass out of distributer 26 through conduit 135, the several wires 176 being suitably and individually insulated. An electrical lead 177 has one end fastened to groove 150 in subassembly 147 and the other fastened to a terminal post 178 which extends through an opening in partition 136. An insulating fiber sleeve 179 surrounds post 178 to insulate it from partition 136. A further electrical lead wire 180 is conductively connected to the other side of post 178 and then passes out of distributer 26 through pipe 135.

Indicator 27 comprises a case 181 which may be provided with a glass 182 on the front thereof and a removable plate 183 bolted to the rear of the case 181. In general, indicator 27 will be mounted on a vertical panel by means of a mounting rim 184 through which bolts may be passed to fasten it to an instrument panel. The back of case 181 may be connected to the other end of pipe 135 by a suitable pipe coupling. A partition 185 is secured inside case 181 and provided with a circular opening 186 over which a mounting board 187 of insulating fiber of suitable structural strength is placed. Board 187 is fastened to partition 185 by bolts 188. In the illustrated embodiment, the indicating means shown comprise a circle of electric lamps 189.

Figure 10:
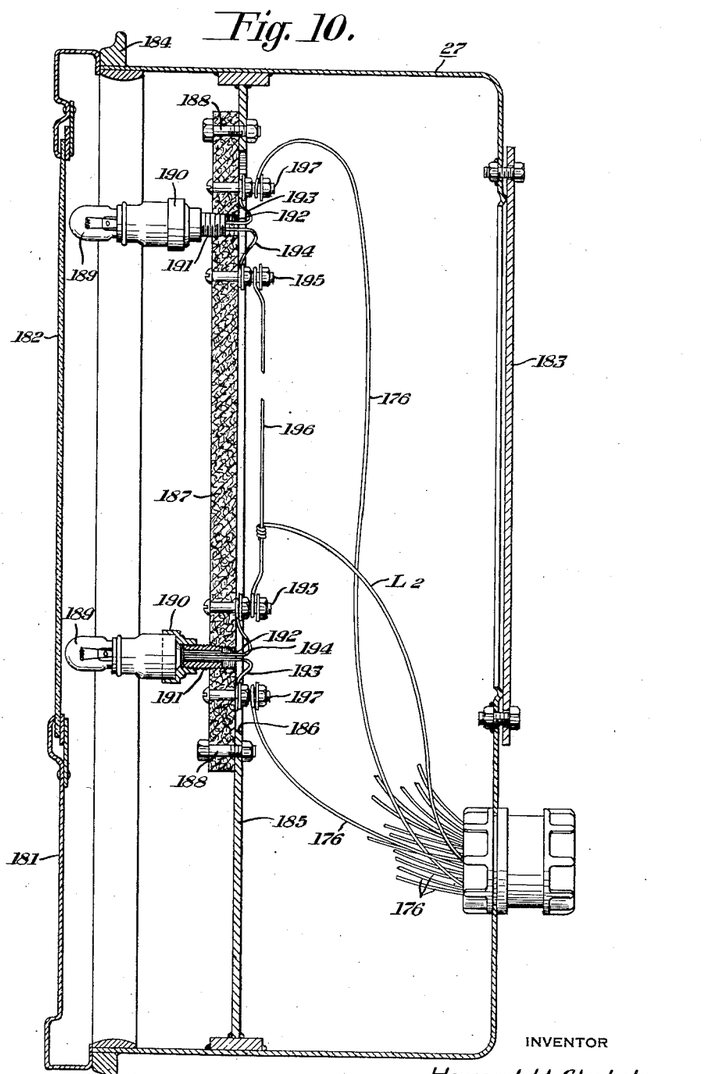
Figure 10 is a view in vertical section of a new indicator used in the system shown in Figure 1.

As shown in Figure 10, each electric lamp 189 is conventionally held in a socket 190. A pipe nipple 191 secures each lamp 189 and socket 190 in its respective position around board 187, the board end of each nipple 191 being screwed into an opening 192 extending through board 187. Each socket 190 has the terminals thereof connected to the two ends of the lamp connected to electrical leads 193 and 194, respectively. As shown, all of the leads 194 are fastened to a respective terminal post 195 arranged in a circle and connected together by a common electrical lead wire 196. All wires in parts of the circuit of this invention are suitably insulated where required. Each electrical lead 193, on the other hand, is connected to a terminal post 197, there also being one such post 197 arranged in a circle for each lamp 189. Each post 197 is respectively and individually connected, electrically, to one of the respective segments 173 of commutator 171. Further, successive conductive segments of commutator 171 are respectively and individually connected to successive lamps 189 around the closed pattern thereof mounted on board 187, the connections to the posts 197 from the segments being by means of the respective wires 176. Wire 180, on the other hand, is conductibly connected to post 126.

Figure 1:
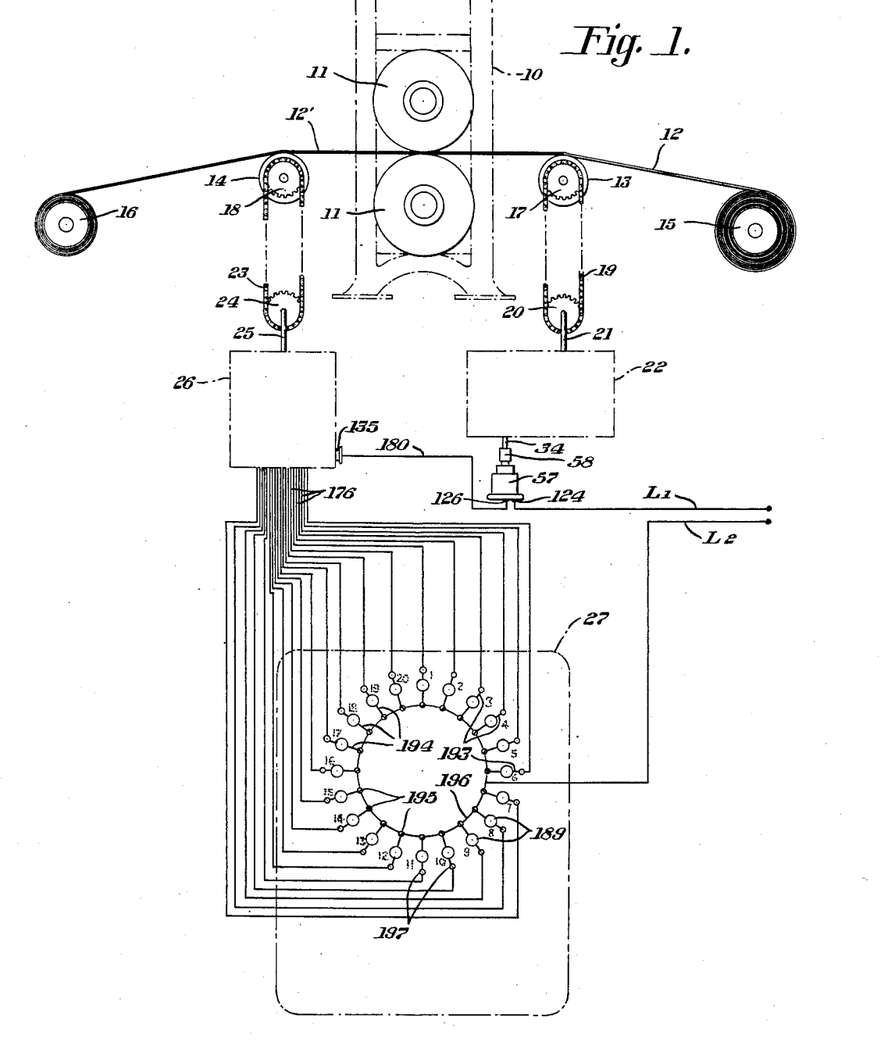
Figure 1 is a schematic representation of the new system of this invention applied to a non-reversing rolling mill.
Figures 2, 8:
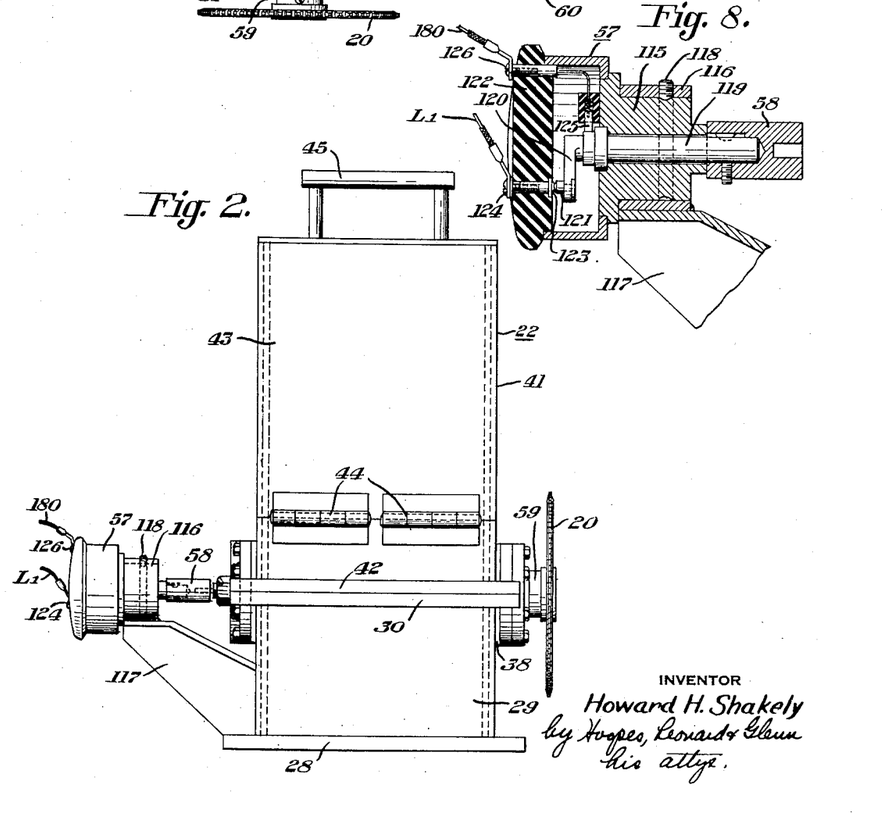
Figure 2 is an end view of a new gear transmission assembly including a circuit breaker, which assembly and circuit breaker are utilized in the system shown in Figure 1.
Figure 8 is an enlarged view in vertical section of the circuit breaker shown in Figure 2.
Figure 3:
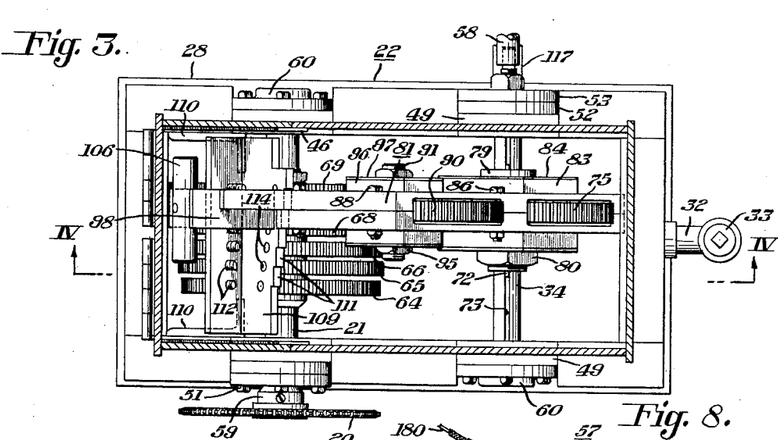
Figure 3 is a plan view of the gear transmission taken along line III—III of Figure 4.
Figure 4:
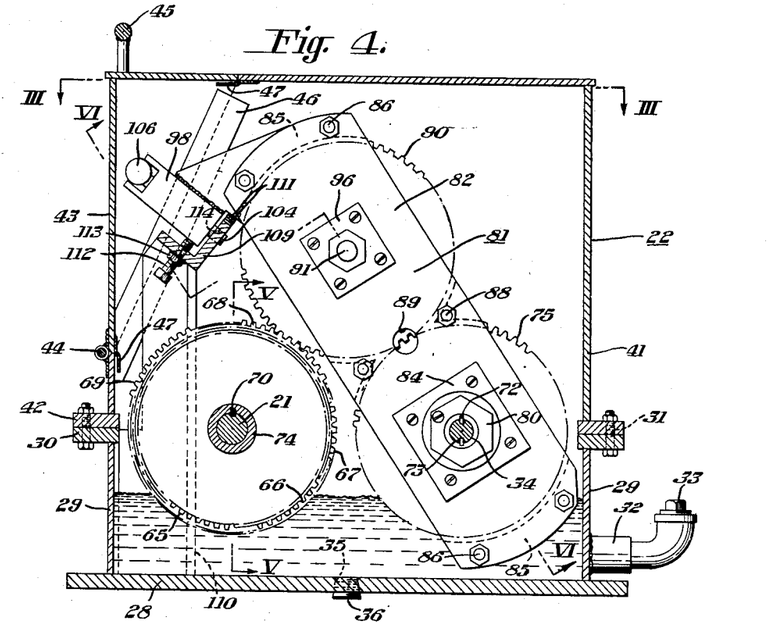
Figure 4 is a side view of the gear transmission taken along line IV—IV of Figure 3.

It will thus be seen that the electrical circuit in the embodiment illustrated is a straight series circuit except in respect of the alternate circuit portions thereof between the indicator 27 and the distributer 26, since one side of each lamp indicating means 189 is respectively connected to a commutator segment 173 in the distributer 26. The source of the electric power for operating the electric circuit of this invention as shown in Figure 1 may be the lines $L_1$ and $L_2$ through which either direct or alternating current of appropriate voltage may be supplied.

As an example, without being limited thereto, of one operation of the new system, it may be assumed that it is desired to temper roll a strip like strip 12 for a 0.005% reduction in thickness in a single pass. It follows that the elongation of that strip for the correct reduction will be a 0.005% increase in the length of the strip on the delivery side of mill 10. If the rolls 13 and 14 are of the same diameter, and the sprocket gears 20 and 24 are also of identical diameter, a timing gear such as gear 64 may be provided with 402 teeth as against 400 teeth on the main gear 75. As shown, idler gear 90 is identical to gear 75. Hence, output shaft 34 will rotate in isochronism with distributer shaft 25 when the gap between the working rolls 11 of the mill produces a precise 0.055% reduction in the thickness of the strip. Under those conditions, each time that movable contact 121 makes an electrical connection with fixed contact 123 in circuit breaker 57, brush 166 will be in contact with the same segment 173 and the same lamp 189, energized through that segment, will light.

On the other hand, if it should happen that a greater reduction in thickness is being attained than that desired, distributor shaft 25 will rotate proportionally faster than output shaft 34 and there will be a leading progression in the lighting of lamps 189 in indicator 27 upon the making of the contact 121—123 in circuit breaker 57. Thus, if we number the lamps as shown in Figure 1 as indicating a leading direction, which as will readily be understood depends upon the arrangement of the wiring connections relative to the direction of rotation of brush holder 158, it may be that lamp No. 3 will light the first time that breaker 57 makes contact followed by the lighting of lamps Nos. 5, 7, 9, 11, etc., as each succeeding contact is made in breaker 57. In that situation, the gap between the working rolls 11 of the mill can be increased until the same lamp, irrespective of its position around the closed pattern on board 187, is lighted each time breaker 57 makes contact. A retrograde lighting of the lamps will occur in a lagging direction whenever the thickness in the strip on the delivery side of the rolls is greater than that desired.

The extent of the lack of isochronism between shafts 25 and 34 will determine the succession of lighting which takes place in the path of the lamps in indicator 27. The time between contacts made in circuit breaker 57 can be regulated by regulating, for example, the sizes of the roll and sprockets to enable the present day high speeds of rolling to be sensibly indicated by indicator 27. Thus, if the strip in a particular instance is travelling at 3000 linear feet per minute on the entry side, there can be an appropriate selection and relation of sprocket and roll dimensions to have one contact made by circuit breaker 57 every second. In that way, a sufficient interval will be provided to enable the eye to detect the amount that the mill may be off in effecting the required thickness. Then an appropriate correction can be applied. If the adjustment of the rolls is off, the time interval in the progressive or retrograde lighting of the lamps 189 will be a measure of the extent that the desired reduction in thickness is not being achieved and from which time interval the percentage of over or under reduction in thickness may readily be calculated or read from precalculated charts.

If in the course of running a single strip it is desired to change the percentage reduction in the thickness thereof or if a new strip is to be run with a percentage reduction in thickness different from that of the immediately preceding rolling operation, transmission 22 can rapidly and accurately be adjusted accordingly. Thus, if in the changed operation a percentage reduction in thickness of .0175% is desired, latch 102 can be withdrawn so that housing 81 can be lifted away from timing gear 64 enough to enable housing 81 to be slid along shaft 34 until opposite gear 69, which for the example mentioned above, would have 409 teeth. Then housing 81 would be moved toward gear 69 until idler 90 meshes with gear 69 and housing 81 comes to rest against the rest bar 109 and adjusting screw 112 in that position, whereupon latch 102 would be released so that tip 104 would snap into opening 114 at that station. The new apparatus and system of this invention make the operation independent of the rolling speed and independent of the gauge of the metal being rolled. For any percentage reduction outside the range of the gear bank 64 to 69, inclusive, other suitable gears affording appropriate ratios for the thickness reduction range desired, can be substituted on shaft 21.

Various modifications may be made in the new devices and system without departing from the scope of the invention as defined in the appended claims.

I claim:

1. In a continuous draft indicator for a rolling mill having entry and delivery rolls respectively rotating at the surface speed of material entering and leaving said rolling mill, in combination, a gear transmission having a shaft connected in a positive manner to one of said rolls, a second shaft in said transmission, positive speed ratio change means interconnecting said shafts, a distributer having a shaft connected in a positive manner to the other of said rolls, a plurality of electrically actuated indicating means, means for successively conductively connecting said distributer to said respective indicating means in the course of the rotation of last last-named shaft, and a circuit breaker coupled to said second-named shaft, said circuit breaker having a constantly energized terminal and being electrically connected by alternate circuits to respective ones of said indicating means through said distributer, whereby a gear ratio in said transmission is adapted to be selected to provide a predetermined time relation between said second shaft in said transmission and said shaft in said distributer.

2. In a draft indicator for a rolling mill having entry and delivery rolls respectively rotating at the surface speed of material entering and leaving said rolling mill, in combination, a gear transmission having a shaft connected in a positive manner to said entry roll, a second shaft in said transmission, positive gear ratio means connecting said shafts, a circuit breaker having a member keyed to said second shaft, said circuit breaker having a constantly energized terminal, a distributer having a shaft connected in a positive manner to said delivery roll, a plurality of indicating means arranged in a closed generally circular pattern, a commutator in said distributer having segments respectively electrically connected to said indicating means, a brush in said distributer successively engaging said segments at a speed proportional to the rotational speed of said shaft in said distributer, a series electrical connection between said brush and said circuit breaker and alternate electrical series connections between said distributer and respective ones of said indicating means, said series electrical connection being operative throughout the period of movement of said rolls, whereby said indicating means will continuously indicate the extent to which the shaft in said distributer and the shaft coupled to said circuit breaker are in a predetermined time relation.

3. In a draft indicator for a rolling mill, in combination, a gear transmission having a shaft, means for driving said shaft proportionally to the speed of material passing on one side of said rolling mill, a gear changer housing mounted on said shaft and movable along said shaft, a main gear in said housing and mounted on said shaft for rotation therewith, an idler gear connected to said housing for movement therewith, said idler gear being in engagement with said main gear, a second shaft having at least one timing gear thereon, said timing gear being in engagement with said idler gear, a circuit breaker having a member fixedly connected to said first-named shaft, said circuit breaker having a constantly energized terminal, a distributer, means for driving said distributer in a positive manner proportionally to the speed of material passing on the other side of said rolling mill, and plural indicating means electrically connected between said distributer and said circuit breaker to indicate the relative rotational speeds between said second-named means and said circuit breaker throughout the period of operation of said mill.

4. In a draft indicator for a rolling mill having entry and delivery rolls, in combination, a distributer having a shaft, means for rotating said shaft proportionally to one of said rolls, a contact ring fixed to said shaft in insulated relation thereto, a cylindrically dished brush holder keyed to said shaft adjacent said ring, a brush fastened to the edge of said brush holder and extending generally radially inwardly into the interior of said brush holder, a commutator having conductive segments arranged concentrically relative to said brush holder and extending into the interior thereof, said brush engaging said segments, a fixed contact member engaging said ring, a lead extending through said brush holder connecting said brush and said ring, a plurality of electric indicating means arranged in a closed pattern, said indicating means being respectively connected electrically to said segments, a circuit breaker connected to said brush, means for moving said circuit breaker proportionally to the other of said rolls, and means for respectively connecting said indicating means and said circuit breaker to a source of electrical energy.

5. In a draft indicator for a rolling mill, a combination, a distributer having a shaft, a contact ring fixed to said shaft in insulated relation thereto, a generally cylindrically dished brush holder keyed to said shaft, a brush fastened to the edge of said brush holder and extending inwardly thereof generally toward the center line of said shaft, a commutator having conductive segments arranged concentrically relative to said center line, said commutator extending axially inwardly of the adjacent edge of said brush holder to engage said brush, and a connector lead extending axially through said brush holder to connect said ring and said brush.

6. In a draft indicator for a rolling mill, in combination, a gear transmission having a splined output shaft, a gear changer housing slideable along and mounted on said shaft, said housing being free relative to said shaft, a main gear mounted on said shaft for rotation therewith, said main gear being within and movable axially with said housing, an idler gear mounted in said housing for movement therewith, said idler gear being in engagement with said main gear, an input shaft extending parallel to said output shaft, at least a pair of timing gears mounted on said input shaft for rotation therewith, said timing gears having different diameters and number of teeth, and positive latch means for holding said idler gear in engagement with the selected one of said timing gears.

7. In a draft indicator for a rolling mill, in combination, a gear transmission having a splined shaft, a gear changer housing having spaced sides, a spindle slidably mounted on said shaft, said housing being freely mounted on said spindle, a main gear mounted on said shaft and slidable axially but not rotatably relative thereto, said main gear being within said sides of said housing for axial movement thereby, an idler gear rotatably mounted in said housing between said sides and in engagement with said main gear, a second shaft extending generally parallel to said splined shaft, at least a pair of timing gears mounted on said second shaft for rotation therewith, said timing gears having different diameters and number of teeth, a rest bar for said housing having stepped surfaces to fix the angular position of said housing relative to said splined shaft corresponding to the distance between centers of the selected one of said timing gears and of said idler gear in engagement with said selected one of said timing gears.

References Cited in the file of this patent
UNITED STATES PATENTS

| | | |
|---|---|---|
| 2,146,632 | Lamb | Feb. 7, 1939 |
| 2,167,513 | Johnston | July 25, 1939 |
| 2,211,657 | Hudson | Aug. 13, 1940 |
| 2,255,935 | Lewellen et al. | Sept. 16, 1941 |
| 2,265,639 | Nagel | Dec. 9, 1941 |
| 2,294,165 | Elms | Aug. 25, 1942 |
| 2,297,812 | Stoltz | Oct. 6, 1942 |
| 2,332,797 | Hume | Oct. 26, 1943 |
| 2,375,602 | Wickham | May 8, 1945 |
| 2,437,048 | Salles | Mar. 2, 1948 |
| 2,580,934 | Love | Jan. 1, 1952 |
| 2,592,312 | Milburn | Apr. 8, 1952 |
| 2,651,772 | Hewes et al. | Sept. 8, 1952 |

U. S. DEPARTMENT OF COMMERCE
PATENT OFFICE

CERTIFICATE OF CORRECTION

Patent No. 2,827,236            March 18, 1958

Howard H. Shakely

It is hereby certified that error appears in the printed specification of the above numbered patent requiring correction and that the said Letters Patent should read as corrected below.

Column 8, line 49, for "0.055%" read -- 0.005% --;  column 9, line 62, for "last last-named" read -- said last-named --;  column 10, line 21, for "time" read -- timed --;  line 63, for "mill, a" read -- mill, in --; column 12, line 16, list of references cited, for the patent number "2,265,639" read -- 2,265,539 --.

Signed and sealed this 29th day of April 1958.

(SEAL)
Attest:

KARL H. AXLINE            ROBERT C. WATSON
Attesting Officer         Commissioner of Patents